United States Patent

[11] 3,594,870

[72] Inventors Heinz Schippers
Remscheid-Lennep;
Rolf Hessenbruch, Remscheid, both of,
Germany
[21] Appl. No. 855,952
[22] Filed Sept. 8, 1969
[45] Patented July 27, 1971
[73] Assignee Barmag Barmer Maschinenfabrik Aktiengesellschaft
Wuppertal, Germany
[32] Priority Apr. 1, 1967, Apr. 21, 1967
[33] Germany
[31] B 91793 VIIa/29a and B 92161 VIIa/29a
Division of Ser. No. 665,443, abandoned,
Continuation of application Ser. No.
14,758, Feb. 25, 1970.

[54] APPARATUS FOR THE PRODUCTION OF FILAMENTS FROM FOILS
8 Claims, 24 Drawing Figs.

[52] U.S. Cl. ..................................... 18/4 S,
225/100, 264/145
[51] Int. Cl. ............................... B29c 15/00,
B29b 3/00, B29d 7/14
[50] Field of Search........................... 18/4 B, 4
M, 4 P, 4 S, 12 DM, 12 DS, 13 D, 19 R, DIG. 17,
DIG. 53; 264/145—147; 225/3, 100

[56] References Cited
UNITED STATES PATENTS
1,661,069  2/1928  Hartung ................. 18/12 (DM) X
2,375,542  5/1945  Euth ....................... 225/100
2,581,922  1/1952  Spencer .................. 18/DIG. 17
2,682,292  6/1954  Nagin ..................... 18/12 (DM) UX
2,723,424  11/1955 Veit ........................ 18/12 (TF)
2,748,401  6/1956  Winstead ................ 18/12 (DM) UX
2,800,180  7/1957  Jensen .................... 225/100 X
2,934,400  4/1960  Siggel et al. ............ 18/DIG. 53
3,253,072  5/1966  Scragg et al. ........... 18/4 (S) X
3,333,032  7/1967  Dickinson .............. 18/4 (P) UX
3,495,752  2/1970  Kim et al. ............... 225/3

*Primary Examiner* — J. Spencer Overholser
*Assistant Examiner* — R. L. Spicer, Jr.
*Attorney* — Johnston, Root, O'Keeffe, Keil, Thompson and Shurtleff ABSTRACT: Apparatus adapted for production of endless, molecularly oriented, multifile filaments of thermoplastic polymers by extrusion of a foil or web through an elongated extrusion slit providing a foil extrusion with strand-forming segments of polygonal cross section and longitudinally extending breaking or tearing lines or zones therebetween. The extruded foil is cooled upon exit from the nozzle or immediately thereafter by surface-cooled rollers or drums or by immersion in a liquid cooler and/or by cooling air applied adjacent the nozzle. Prior to solidification, the extruded foil is longitudinally at least several times its original length. After cooling and solidification, it is again stretched between stretching roller assemblies to axially orient the polymer molecules and to tear the foil into filaments or strands along the breaking or tearing lines or zones.

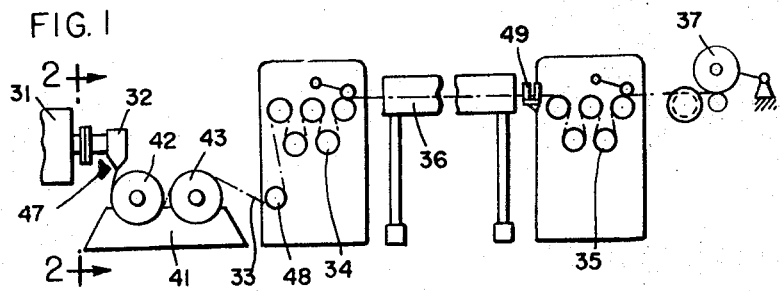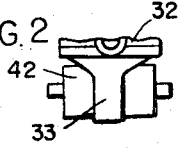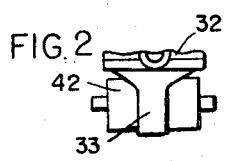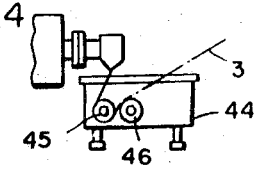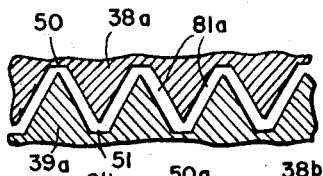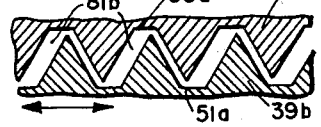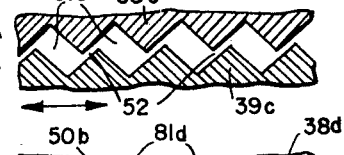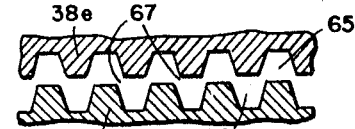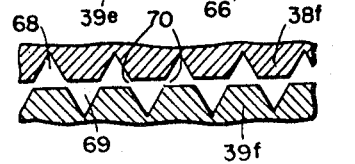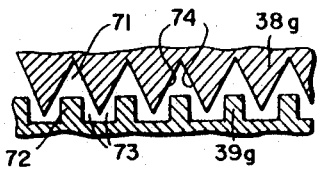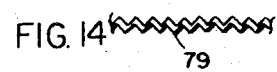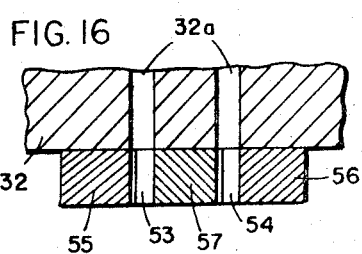

INVENTORS:
HEINZ SCHIPPERS
ROLF HESSENBRUCH

APPARATUS FOR THE PRODUCTION OF FILAMENTS FROM FOILS

RELATED APPLICATION

This application is a divisional application of our application Ser. No. 665,443, filed Sept. 5, 1967 now abandoned and a continuation application Ser. No. 14,758 has been filed on Feb. 25, 1970 therefore.

INTRODUCTION

With the conventional melt-spinning of thermoplastic multifile filaments, the freshly extruded, separate filaments or capillaries have a tendency to stick together or at least partially to fuse with one another on or immediately after the melt has issued from the extrusion nozzle. There is also a tendency for the filaments to break during the subsequent drawing out and stretching. Consequently, many different proposals have already been made for substantially preventing the sticking together and for reducing the number of filament breakages, by providing in some way or another for a rapid cooling and gentle further treatment of the separate filaments or capillaries. See, for example, German Pat. No. 807,248.

The present invention follows an entirely different approach. It is based on the knowledge that the defects which formerly arose with the melt-spinning of thermoplastic multifile filaments cannot occur if the multifile filaments or capillaries are intentionally formed as part of a foil, and these are therefore initially extruded as a part of the foil which corresponds to a ribbon of several or a large number of closely juxtaposed strands. This foil is then split up into continuous uniform separate strands and/or filaments.

It has of course already previously been proposed, for textile purposes, to cut a thin web of paper, cellulose or other materials into narrow strips, (e.g., U.S. Pat. No. 2,106,896) or to orient thin foils or foil strips of thermoplastic high polymer masses by stretching and to divide them by subsequent mechanical action of various types, for example, by brushing, twisting and the like into elements of fiber form and similar to natural fiber. Such fiber formations are no longer able to satisfy the relatively high standards for further processing, on account of the irregular dimensions of the separate fibers. Various other processes are also known in which flat or longitudinally ribbed strips of foil are oriented by stretching and are split up into an irregular network of fibrillae by blowing or twisting or by the foil skin connecting the ribs being slit at various places. The fibrillae, however, remain connected to one another at more or less small intervals. See, for example German Pat. specifications Nos. 1,040,663 and 1,035,657.

DESCRIPTION OF THE INVENTION

In contrast to these known proposals, the present invention provides apparatus in which the thermoplastic polymer composition is extruded as a longitudinally ribbed, profiled foil of arbitrary width with linear, preferential breaking lines or zones which extend longitudinally and in parallel relationship in one or more planes and also with profiled strands or ribbons which are situated between the said lines or zones and which are approximately geometrically similar to the subsequent separate capillary profile. This foil web, immediately after or on leaving the extrusion nozzle and before reaching or being immersed in a coolant, is drawn out by several times its original length. The reduced foil web solidified by cooling is thereafter stretched sufficiently to provide a molecular orienting action monoaxially in its longitudinal direction and continuous breaking or tearing along said lines or zones into endless, separate strands or filaments without any further action.

In order that the foil web break up with certainty in the preferential breaking zones into defined endless separate thread formation capillaries, it is important for the web to have a shape which assists the effectiveness of the operation. Particularly suitable for this purpose is an overall corrugated and/or zigzag shape in which the surface of the cross section of the flat foil is constant throughout its length and is formed by a plurality of individual shapes which lie juxtaposed over the width of the foil and are connected to one another in the preferential breaking regions. The individual shapes may be staggered relatively to one another perpendicularly of the width of the foil.

The linear parallel preferential breaking regions are essential to the separation of the web into separate strands. The individual shapes or profiles, which can lie adjacent one another in one plane or can also be staggered relatively to one another perpendicularly of the plane of the foil, are interconnected in those preferential breaking regions. With a longitudinally profiled foil extending in zigzag form, the angles which are formed in the cross section are preferably always at least 30°. The linear preferential breaking regions have a reduced transverse strength by comparison with the remainder of the foil. This reduced transverse strength can be obtained by the preferential breaking regions being formed by reducing the foil thickness.

A lengthening and reducing effect is produced by drawing out the hot profiled foil immediately on or after emerging from the extrusion nozzle. The extent of the reduction depends on the speed of withdrawal which is increased in relation to the extrusion speed, and also on the cooling and solidification conditions of the foil. Consequently, the foil issuing from the extrusion nozzle should first of all be guided through a cooling bath and/or over cooling cylinders with a withdrawal speed which is several times greater than the extrusion speed and cooled to below its solidification temperature, and only thereafter should the foil or web be subjected to an orienting and monoaxial stretching at high temperature. A water bath or an air bath can be used as cooling bath. The cooling cylinders can possibly also serve at the same time as withdrawal cylinders.

In order to produce transverse, bending or sheering forces that are effective with maximum intensity on the preferential breaking regions, the projections of the foil web may, on travelling over the cylinders, be arranged to bear alternately on the cylinders and to be deflected several times. It may in addition be advantageous if the foil is alternately deflected laterally once or several times within the stretching zone in its plane of travel. This meandering movement assists the breaking up into separate threads.

The hot foil issuing from the extrusion nozzle can be considerably reduced in known manner. The foil or web emerging from the extrusion nozzle can, before the solidification thereof and before the stretching which serves for the orientation, be drawn out to more than twice, and preferably to at least 5 to 10 times, its original length, and thereafter, in this reduced and solidified state, is stretched in the stretching zone under the action of heat by at least twice its length on entering the said stretching zone. By the combination of these two successive procedures, a reliable separation into endless individual threads is obtained in a particularly simple manner. In this way, it is possible to produce from the foil separate, relatively fine filaments, for example, of 30 denier or even less.

Depending on the material being used, it may be desired in an individual case to prevent a too extensive reduction by drawing out the hot foil and to restrict this by a premature cooling and solidification. For this purpose, the travelling foil or web withdrawn from the extrusion nozzle can be solidified by the action of a separate coolant for the purpose of preventing a further reduction in the transverse dimension before it runs on to the withdrawal cylinder which pulls it from the nozzle. For this purpose, it is advantageous to use an air nozzle constructed in knifelike form, through which cooling air or compressed air is blown against the foil or web transversely of its direction of travel. Such a knifelike or thin nozzle can however also be used very effectively with a cooling cylinder arrangement for pressing the foil or web at high withdrawal speeds firmly on to the cooling or withdrawal cylinder and preventing an entrainment of air between the foil or web and the cylinder surface.

The shaped or profiled foil can be extruded as a flat or curved web of arbitrary width or simultaneously as a plurality of profiled foil strips. For this purpose, it is possible to use wide slit-type nozzles or open or closed annular nozzles with one or more mouthpieces, which correspond to the proposed foil or web profile which is of corrugated and/or zigzag form. A wider foil can also be cut into narrow longitudinal strips before the stretching operation.

The foil as such can be extruded from a thermoplastic polymeric material which is already dyed to the required color and is provided with metallic additives, for example, powdered aluminum and/or foam-forming additives in order to produce particular effects.

For producing particular optical or mechanical effects, the extruded foil can consist of several layers of different colors or components lying one above the other or of several such layers in juxtaposed relationship. If desired, one or more of these superimposed or juxtaposed layers can also be formed.

Particular effects can be produced if the foil or the strands consisting of separate capillaries is provided with surface embossings. The foil, after split up into separate strands or filaments, may be subjected to a subsequent stretching and/or setting action.

By means of the measures proposed by the present invention, it is possible to produce in a particularly simple and advantageous manner endless filaments or strands which have a high strength and are especially suitable for many different industrial purposes, for example, for further processing into ropes, sacks, insulating mats and the like. On the other hand, the multifile filaments produced by the invention are very similar in appearance to natural fibers, and this facilitates their use for similar purposes. As compared with foil strips which are split up irregularly or in latticelike manner, they also have a substantially improved uniformity of denier and cross section of the separate capillaries. The tensile and shearing strength, as well as the bonding elasticity, are considerably improved.

The endless multifile filaments produced by the invention can also be used for textile purposes and can be further processed by usual methods into yarns and other textile products. The filaments formed from the foil can also be cut or broken into staple fibers in known manner.

Particular advantages of the invention consist firstly of the easy handling of the initially extruded foil or web, more especially as this is placed in and is travelling through the drawing out and the stretching frame, and secondly, the multifile elements obtained from the foil or web are, to a certain degree, given a roughened surface by the breaking off of the separate capillaries from the foil at the breaking lines, so that they have a particularly good handle and can therefore be more easily wound or rewound and twisted. With the subsequent further processing, they lie without slipping in the structure of the twisted material, rope or fabric. An additional advantage is that all types of polymers which can be given a permanent orientation and which are suitable for the manufacture of threads and yarns can be used, and that neither a particular purity nor any special treatment of the initial materials is necessary. Furthermore, in view of the numerous possible users, the foil and the slivers of endless multifile filaments resulting therefrom can be produced in different thicknesses, widths and with a different overall stretching. For example, it is readily possible, by altering the amount of the drawing out and stretching to adjust the elasticity modulus (elongation behavior) or the tensile strength within the limits given by the initial material very uniformly to the purpose to which the final product is to be used. The tendency of the oriented foil to break into endless separate capillaries along the preferential breaking regions can also be greatly supported by suitable mixing of the polymeric initial materials, for example, by extruding a mixture of at least two chemically related or different polymeric substances. It is possible to extrude mixtures of polymers which are compatible with one another and form only one phase on melting or after solidification. However, it is also possible to work with mixtures of polymers which present a miscibility gap in the solid or liquid state, provided the polymer mixtures are generally suitable for forming a film.

A suitable apparatus for carrying out the process according to the invention comprises a worm press with a nozzle or nozzles, and driven rollers and winding arrangements, wherein the nozzle or nozzles has or have openings in one or more planes and at least one of the nozzle lips of each nozzle opening is arranged to be replaceable and/or adjustable. The adjustment of the nozzle lips can be effected perpendicularly and/or laterally of the extruded foil web. By this means it becomes possible in a particularly simple manner to produce foil or webs with a different thickness or modified profile cross section. Thus it is possible as desired to produce filaments or threads of a coarser or finer denier, using one and the same nozzle.

BRIEF DESCRIPTION OF THE DRAWINGS

In the accompanying drawings:

FIG. 1 is a diagrammatic illustration of a complete installation for the continuous production of endless multifile threads or filaments from a thermoplastic polymeric plastic foil or web with devices for extruding, stretching and solidifying the foil, and also for molecularly orienting and splitting the foil into predetermined endless separate filaments along the preferential breaking zones and for winding the multifile filaments thus obtained;

FIG. 2 is a fragmentary view, on the section plane 2–2 of FIG. 1, of the extrusion zone of the apparatus, and shows extruding, stretching and solidifying a foil or web of relatively large width;

FIG. 3 is a similar view to FIG. 2 of an extrusion zone with a plurality of extruded foil or web strips of small width;

FIG. 4 shows a detail of another embodiment for drawing out and solidifying the foil or web strips in a liquid bath;

FIGS. 5 to 11 are fragmentary views of various modifications of cross sections through the lips of a wide slit nozzle on an enlarged scale;

FIGS. 12 and 13 show embodiments of multilayer, extruded foil or web cross sections;

FIG. 14 shows the reduced cross section of the drawn foil or web from the nozzle of FIG. 7 after the stretching zone for the orienting of the molecular structure;

FIG. 16 is a section through the nozzle of FIG. 15 on section plane 16–16;

DESCRIPTION OF PREFERRED EMBODIMENTS

Figure 15:
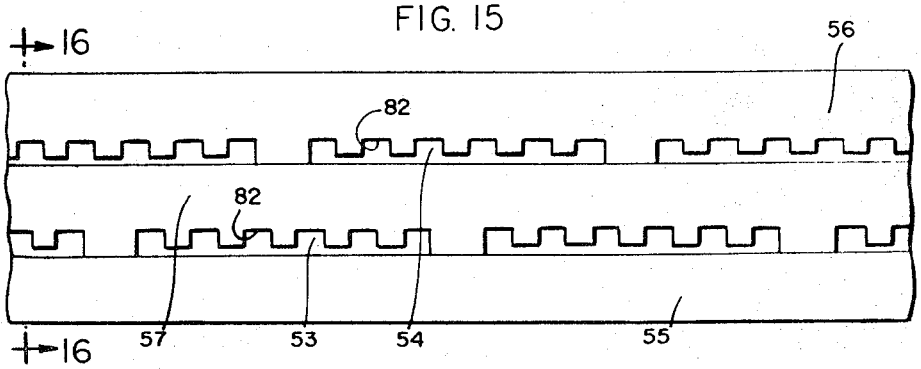
FIG. 15 is a fragmentary front elevation of a divided, wide slit nozzle with a plurality of separate nozzle segments in each of two extrusion planes or levels.

FIG. 1 shows an extrusion installation which consists in part of known structural elements, namely, of a worm press 31 with one or more wide slit nozzles 32 for extruding a polymeric foil or web 33, a stretching zone serving for the orienting of the molecular structure of the foil or web and having the roller assemblies 34 and 35 and a heating duct 36 between the roller assemblies 34 and 35 and finally a filament-winding assembly 37.

The installation has one or more wide slit nozzles 32 which are constructed and arranged according to the invention. FIGS. 5 to 11 show a few possible geometrical forms of the nozzles or nozzle lips 38 a—g and 39 a—g, which are arranged opposite one another with the same or varying gap width so that the foil webs extruded through them have cross-sectional profiles which correspond to the actual nozzle gap and which extend in undulating and/or zigzag form.

The plasticized thermoplastic polymer composition can be extruded from the nozzles 32 as narrow, longitudinally profiled foil strips each having a width smaller than 48 mm. and advantageously 20 to 25 mm. and a width/mean thickness ratio of at least 10:1. These strips are, before being cooled, drawn out by at least 5 to 20 times their original length.

A withdrawal assembly 41 constructed as cooling cylinder assembly is arranged immediately after the extrusion nozzle or nozzles 32 in the direction of movement of the web 33, and includes driven cylinders 42 and 43 which draw off the extruded foil or web 33 (or the foil strips) from the nozzle 32 at a withdrawal speed which is increased in relation to the extrusion speed and draws out the web or strips 33 to the prescribed amount of the elongation and reduction, before the web or strips reach the cooling cylinders and before the cooling and solidification of the web or strips which is caused by the cylinders. This is illustrated in FIGS. 2 and 3.

As shown in FIG. 4, a cooling bath 44 containing water or other liquid may be arranged after the nozzle or nozzles 32, the bath can be associated with a withdrawal roller assembly 45, 46 which may be arranged in the bath (as shown) or after the bath. However, it is generally preferred to use a cooling cylinder assembly instead of the cooling bath, since the projections or indentations of the profiled foil or web entrain liquid from the cooling bath, and this liquid, in passing through the stretching zone, leads to corrosion of the first set of rollers and to the formation of steam in the heating duct.

The free path through which the foil web or strips 33 travel after leaving the extrusion nozzle or nozzles until they reach the first cooling cylinder should be as short as possible, and for example only 100 mm. long, in order to avoid excessive transverse contraction and reduction of the web or webs. The free path can however possibly be shortened by arranging a knifelike air nozzle 47 between the nozzle opening or openings 32 and the cylinder 42 in or adjacent the travel of the foil or strips 33 and transversely of the latter. The nozzle 47 blows cooling air on to the hot web or foil for the purpose of premature cooling and solidification thereof.

The reduced foil or web 33 (or strips) is conveyed by the cooling cylinder assembly 42, 43 over a guide roller 48 (FIG. 1) to the first set of rollers 34, the driven rollers of which wet rotate at approximately the same peripheral speed as the cooling cylinders. The web or strips are drawn from the roller assembly 34 through the heating duct 36 by the second roller assembly 35 running at a higher peripheral speed. The web or strips are thereby stretched for the purpose of orienting the molecular structure thereof and for further reduction. As a specific and particularly surprising effect as compared with the known processes, the profiled foil web or strips, after being oriented, then split on running over the last rollers of the second roller assembly 35 exactly at the prescribed preferential breaking regions into endless defined separate filaments of maximum uniformity. The separate filaments are completely separated from one another and do not have a latticelike connection with one another. It is also unnecessary to produce the separation by further operations such as brushing, twisting and the like or even to effect the division into the separate filaments by means of sets of knives.

In some cases, it may be useful also to provide in the stretching zone a device 49 for a single or repeated lateral deflection. The foil then carries out a meandering movement. The additional shearing forces which thereby occur are also effective on the preferential breaking regions and thus assist the separation into individual filaments or capillaries. To all appearances, the tensile, bending and shearing forces, which are set up by the alternate travel over the cylinders or rollers cause the oriented profiled foil or web to break up at the prescribed preferential breaking regions.

The preferential breaking regions are, for example, situated at those places where there are changes in direction in the cross section. With the shapes or profiles corresponding to FIGS. 5 and 6, this is the case at the peaks and valleys 50, 51 and 50a, 51a. With other shapes, as for example that according to FIG. 7, the preferential breaking regions are in the thin-neck portions 52 of the shaped foils. With foils which consist of layers of different materials and which are disposed in juxtaposition or superimposition, the preferential breaking regions can be the places where these materials meet one another.

FIGS. 15 and 16 show how it is possible to form two rows of foil strip nozzles 53 and 54 in different planes by means of three rails 55, 56 and 57 in the extrusion nozzle 32. The middle rail 57 forms one of the nozzle lips for two rows. The two rows are arranged offset from one another, so that the foil strips issuing from the nozzles can be jointly drawn off by one withdrawal assembly. However, it is also possible for several nozzles to be connected to one worm press and arranged juxtaposed or offset one after the other. It may be necessary to provide a separate withdrawal mechanism for each nozzle, by which the reduced strips are jointly caused to travel through the stretching assembly.

FIGS. 17 to 22 show further possible shapes or profiles of nozzles with lips 58, 59 which face each other with a varying and adjustable gap width. One lip surface can have grooves of V-shaped or trapezoidal cross section and face a planar or flat surface. The nozzle sections 60 for forming the breaking zones 61 are located at the narrow lines or spaces between nozzle lips.

Figure 21:
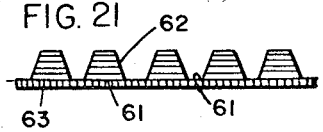
FIGS. 21 and 22 show multilayer or multisegment foil cross sections produced by extrusion from the nozzle of FIG. 19.
Figure 22:
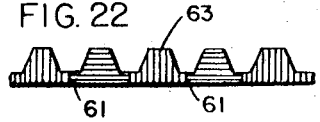

FIGS. 21 and 22 show foil strips which consist of juxtaposed or superimposed layers of different materials 62 and 63. The preferential breaking regions 61 can be the places where these materials contact one another. The different materials 62 and 63 may be different thermoplastic polymers, different colored thermoplastic polymers of different or like kind, one or more foamed polymers, and the like, especially those in which one material is of a different kind and/or appearance from the other material.

Figure 17:
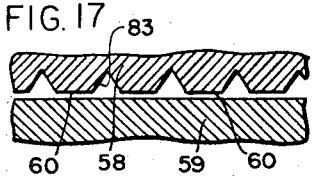
FIGS. 17–20 are fragmentary front elevations on an enlarged scale of additional extrusion nozzle embodiments, one lip of which is planar.
Figure 18:
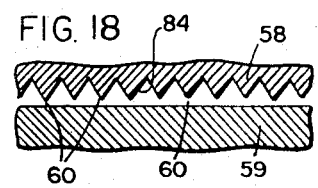
Figure 19:
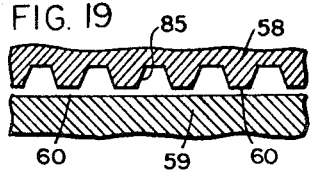
Figure 20:
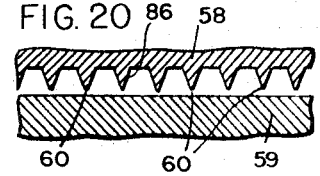
Figure 23:
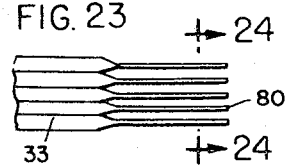
FIG. 23 is a plan view of a foil strip and illustrates spontaneous splitting in the stretching zone.
Figure 24:
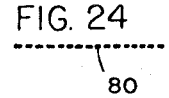
FIG. 24 is the cross section of the ribbon of split-apart multifile filaments obtained after leaving the stretching zone.

The intermediate and final products of the process according to the invention are shown diagrammatically and on an enlarged scale in FIGS. 23 and 24, using as an example a foil strip extruded from the nozzle of FIG. 17. An already considerably reduced profiled foil, web or strip 33 tears or breaks off in the stretching zone at its preferential breaking lines into endless separate filaments or strands 80. The cross section of the resulting endless multifilaments 80 is shown in FIG. 24. These multifilaments can first of all be wound in known manner into packages and can then be supplied as such for further processing. However, it is also possible to add to the further treatment other processing steps, for example, the texturizing of the multifilaments, the cabling and the cutting into staple fibers or other treatments adapted to the delivery speed of the multifilaments.

The filament-forming thermoplastic polymers which may be employed in the practice of the invention include polyolefins such as polyethylene and polypropylene, polyamides such as polycaprolactam and nylon 66, polyesters such as polyethylene terephalate, polyvinylchloride, as well as copolymers and interpolymers of the respective monomers with other copolymerizable monomers wherein the separated or connected, extruded strands can be drawn and preferably also molecularly oriented. The strands, as extruded in the foil, preferably have a polygonal cross section, the geometry of which is maintained approximately when the strands are stretched into filaments of smaller cross section at least sufficiently to attain molecular orientation of the polymer molecules, e.g., at least twice the length of the solidified foil fed to the stretching zone.

The strand-forming segments of the foil are riblike segments of polygonal transverse cross section, such as segments 77 and 78 of FIG. 13 or 62 and 63 of FIGS. 21 and 22, and correspond to the respective shapes of strand-forming segments or recesses 65, 66, 68, 69, 74, 81a—81d, and 82—86 (FIGS. 5—11 and 15—20) as defined by one or both of the opposed lips of the nozzle slits. The foils preferably have a width less than 48 mm. and a width to mean thickness ratio of at least 10:1. Certain resultant foils may be characterized as transversely corrugated or zigzag foils with longitudinally parallel strand-forming segments of polygonal, transverse cross section. The breaking or tearing lines or zones are narrow, longitudinal segments having a substantially smaller transverse tear strength than said strand-forming segments, e.g., the lines, strips or zones 50, 51, 50a, 51a, 52, 67, 70, etc. The strand-forming segments preferably are 3 or 4 sided polygons in transverse cross section, e.g., triangular, rectangular, or regular trapezoidal.

The extruded foil preferably is stretched several times its length immediately after extrusion and prior to cooling below the solidification temperature of the polymer on cooling cylinders 42, 43, in cooling bath 44, or the like. Such stretching is at least twice the original length, preferably 5—20 times such length. The after-stretching of the cooled, solidified foil may be used to effect molecular orientation and to achieve the breaking or tearing of the foil into strands or filaments without additional severance means such as cutting knives, particularly by conducting the foil in an undulating path over one or more series of relatively small diameter stretching rollers such as roller assemblies 34 and 35.

The invention may provide special effects in the resultant filaments such as improved handle of the filaments by ragged tear edges which are left along the breaking lines or zones along one or more sides of each filament, use of different polymer compositions of different polymers, use of different colors in coloring of like or different polymers, use of foamed polymers, surface embossing of the strands before stretching into fine filaments, etc.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

We claim:

1. An extrusion apparatus comprising a press for extruding a foil of thermoplastic polymer through an extrusion nozzle, said extrusion nozzle having a nozzle face with an elongated extrusion slit formed by opposed lips defining therebetween spaced, three-to-four sided polygonal, strand-forming openings, said lips further defining narrow spaces next to and connecting said openings to provide longitudinal breaking lines or zones between the strand-forming segments in a foil extruded therefrom, cooling means adjacent said nozzle for cooling the extruded foil below its solidification temperature, stretching means for simultaneously stretching the extruded foil upon or immediately after extrusion at least several times its original length, and a pair of roller assemblies following said cooling means and said stretching means for conducting said foil in an undulating path over respective roller assemblies for stretching said foil to provide molecular orientation of said polymer and for simultaneously breaking said foil into individual filaments along said breaking lines or zones, each of said roller assemblies being composed of a plurality of rollers in two horizontal rows with the one side of the foil in contact with the rollers of one horizontal row and the other side of the foil in contact with the rollers of the other horizontal row of each of said roller assemblies, whereby said foil is flexed along said breaking lines or zones as it passes over said rollers.

2. An extrusion apparatus as claimed in claim 1 wherein one of said lips has a planar face, and said other lip having polygonal recesses with said narrow spaces between said recesses.

3. An extrusion apparatus as claimed in claim 1 wherein said means for cooling comprises one or more rotatable cooling cylinders adapted to draw said foil after extrusion over the cooled surfaces of said cylinders.

4. Apparatus as claimed in claim 1 wherein said lips define therebetween a zigzag or undulating space with said narrow spaces at the peaks and valleys of said zigzags or undulations.

5. Apparatus as claimed in claim 1 wherein said lips define therebetween a zigzag or undulating space with said narrow spaces provided at every other zigzag or undulation, and said strand-forming recesses at the remainder.

6. An extrusion apparatus as claimed in claim 1 wherein said lips define vertically staggered 3—4 sided polygonal strand-forming recesses with said narrow spaces at the intersections of contiguous strand-forming recesses.

7. An extrusion apparatus as claimed in claim 1 wherein a heating duct for heating said foil is interposed between said roller assemblies.

8. An extrusion apparatus as claimed in claim 3, and nozzle means immediately contiguous to said extrusion nozzle for blowing cooling air against said foil as it is extruded from said nozzle.